May 1, 1923.
C. A. LONGENBAUGH
1,453,685
SHIELD FOR MOTOR VEHICLES
Filed April 10, 1922
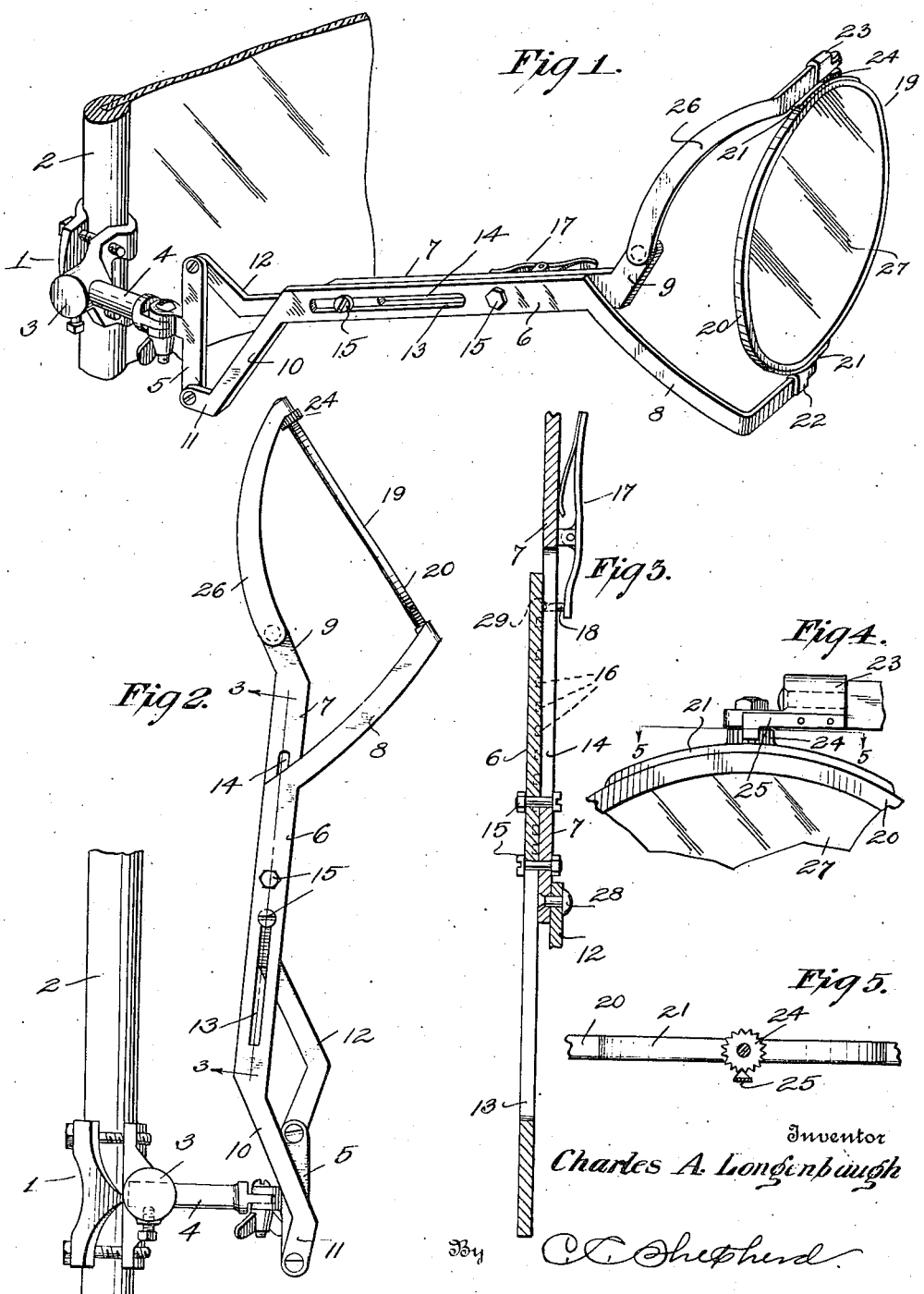
Inventor
Charles A. Longenbaugh
By C. C. Shepherd
Attorney Patented May 1, 1923.

1,453,685

UNITED STATES PATENT OFFICE.

CHARLES A. LONGENBAUGH, OF COLUMBUS, OHIO.

SHIELD FOR MOTOR VEHICLES.

Application filed April 10, 1922. Serial No. 551,385.

*To all whom it may concern:*

Be it known that I, CHARLES A. LONGENBAUGH, a citizen of the United States, residing at Columbus, in the county of Franklin and State of Ohio, have invented certain new and useful Improvements in Shields for Motor Vehicles, of which the following is a specification.

The present invention is directed to improvements in glass shields for motor vehicles, and has for its primary object to provide a device of this kind capable of being detachably mounted on the wind shield, and which is easily and quickly adjustable to suit varying conditions.

A further object of the invention is to provide a device of this character which is so constructed that the device can be quickly adjusted and held positively in adjusted positions, and as easily moved to an inoperative position.

A further object of the invention is to provide a glass shield constructed and arranged for attachment to a motor vehicle so that the eyes of a driver will be protected against extremely bright lights, especially when driving at night, the shield being formed from colored glass so that the blinding glare from the head lights of an approaching car will be reduced so as to prevent accidents.

With these and other objects in view, as will appear as the description proceeds, the invention consists in the novel features of construction, combinations of elements and arrangements of parts, hereinafter to be fully described and pointed out in the appended claims.

In the accompanying drawing:

Figure 1 is a perspective view showing the device in one of its adjusted positions, Figure 2 is a side elevation of the device showing it in another adjusted position, Figure 3 is a sectional view on the line 3—3 of Figure 1, Figure 4 is a fragmentary side elevation of one of the shield supporting brackets, and Figure 5 is a sectional view on the line 5—5 of Figure 4.

Referring to the drawing 1 designates a clamp adapted to be secured preferably to one of the side rails 2 of the usual wind shield, said clamp having a lug 3 carried thereby, and in which is adjustably secured a horizontally disposed post 4. Pivotally and frictionally engaged with this post is a normally vertically disposed plate 5.

The device further consists of a pair of relatively slidable bars 6 and 7, the upper ends of which terminate in convergingly arranged arms 8 and 9, respectively, the latter being greater in length than the former. The lower end of the bar 6 terminates in an angularly disposed arm 10, the lower end of which terminates in an extension 11, which is arranged in angular relation with the arm 10, said extension being pivotally connected with the lower end of the plate 5. The lower end of the bar 7 has pivotally connected thereto the upper end of an angle link 12, the lower end of which is pivotally connected with the upper end of the plate 5, and it will be noted, upon reference to Figure 2 that the longitudinal centers of the bars 6 and 7 are not aligned with the pivotal connections of the arm 10 and link 12, the purpose of which will appear later.

The bars 6 and 7 are provided with longitudinal slots 13 and 14, respectively, and each bar carries a stop bolt 15 for slidably engaging the slot of the adjacent bar, as clearly shown in Figure 3 of the drawing. These bars are in close sliding contact, the relative sliding movement being limited by the bolts 15 engaging with the end walls of the slots as will be obvious.

The bar 6 is provided with a plurality of aligned sockets 16, there being a spring pressed latch 17 pivotally mounted on the bar 7, and the bill 18 thereof being adapted to selectively engage the sockets to hold the bars positively in adjusted positions.

The glass shield 19 comprises a circular frame 20 to which is secured, at diametrically opposite points, brackets 21, the lowermost bracket being pivotally connected with the head 22, which is pivotally connected with the free end of the arm 8. A similarly mounted head 23 is provided and to this is pivotally connected the uppermost bracket 21, said bracket having rigidly associated therewith a toothed disk 24. A resilient pawl 25 is carried by the head 23 and is yieldably engaged with the disk 24 and serves to hold the frame 20 in adjusted positions. The head 23 is pivotally connected with one end of the angle link 26, the other end of which is similarly connected with the arm 9.

Mounted in the frame 20 is a glass panel 27, which is colored to reduce the glare of bright lights.

In Figure 1 the device is shown in one of its adjusted positions, and at which time the shield 19 is in the line of vision of the driver, and since the entire device, as well as the shield is adjustable, it will be apparent that it can be moved to many other positions, and out of the way when not in use. In Figure 2 the device is shown in its inoperative position, and at which time the pivotal connection of the link 12 and bar 7 is non-aligned with the similar connection of the extension 11, and said arm with the plate 5, which being the case the bars will be held against accidental relative sliding movement, thereby holding the device in its inoperative position, and at which time the bill 18 of the latch 17 is in its inoperative position. It will be obvious that when the device is swung downwardly to its operative position that the bill of the latch will engage a selected socket 16, it being of course understood that the latch has been operated to clear all the sockets except the selected one, and when engaged therein the bars 6 and 7 will be interlocked and held against relative sliding movement. The bill 18 is beveled, as at 29 so as to ride over the sockets when the device is moved to the position as shown in Figure 2. It will be understood that as the bars 6 and 7 slide that the link 26 and arm 8 will move relatively, thereby swinging the glare shield 19 from an inclined position to a vertical position whereby the shield will be brought into the line of vision of the driver, and since the frame 19 is pivotally supported for swinging movement on a vertical axis it may be retained in the line of vision regardless of the position of the bars 6 and 7.

What is claimed is:

1. In a device of the class described, a pair of relatively slidable bars, means for pivotally attaching the bars to a vehicle, means for limiting the sliding movement of the bars, a link and arm associated with the respective bars, a glare shield pivotally mounted between the link and arm and capable of swinging automatically on its horizontal axis when sliding movement is imparted to the bars, link and arm.

2. In a device of the class described, a clamp adapted for attachment to a vehicle, a plate pivotally connected with the clamp, a pair of relatively slidable bars, the lower ends being provided, respectively, with a link and angle arm for pivotal engagement with the plate, the upper ends being also provided respectively, with a link and arm, a glare shield pivotally connected with the latter link and arm and capable of swinging movement on its vertical axes, and automatically on its horizontal axes when sliding movement is imparted to the bars, as and for the purpose set forth.

3. In a device of the class described, a clamp adapted to be attached to a vehicle, a pair of relatively slidable bars pivotally connected with the clamp, means for limiting the relative sliding movement of the bars, a latch carried by one of the bars for cooperation with the other bar to hold said bars in selective adjusted positions, and a glare shield pivotally associated with said bars and capable of being swung on its horizontal axis when the bars are moved longitudinally.

4. In a device of the class described, a pair of longitudinally sliding bars, means for supporting the bars on a vehicle, a glare shield pivotally associated with the bars and capable of swinging automatically on its horizontal axis when sliding movement is imparted to the bars.

5. In a device of the class described, a pair of relatively slidable bars, means for pivotally connecting the lower ends thereof with a vehicle, the upper ends of said bars being provided, respectively, with a link and arm, a glare shield rotatively mounted between the link and arm and capable of swinging movement on its vertical axis, and automatically on its horizontal axis when sliding movement is imparted to the bars, and means for holding the shield against rotation on its vertical axis.

In testimony whereof I affix my signature.

CHARLES A. LONGENBAUGH.